United States Patent
Childress et al.

(10) Patent No.: US 9,045,218 B2
(45) Date of Patent: Jun. 2, 2015

(54) AUTONOMOUS AIRCRAFT WITH DISCONNECTABLE TETHER

(71) Applicant: The Boeing Company

(72) Inventors: James J. Childress, Mercer Island, WA (US); John J. Viniotis, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 54 days.

(21) Appl. No.: 13/791,105

(22) Filed: Mar. 8, 2013

(65) Prior Publication Data

US 2014/0251743 A1    Sep. 11, 2014

(51) Int. Cl.
| | | |
|---|---|---|
| *B64B 1/50* | (2006.01) | |
| *B64C 19/00* | (2006.01) | |
| *B60L 9/00* | (2006.01) | |
| *B64B 1/40* | (2006.01) | |
| *B64C 39/02* | (2006.01) | |

(52) U.S. Cl.
CPC . *B64C 19/00* (2013.01); *B64B 1/50* (2013.01); *B64C 2201/123* (2013.01); *B64C 2201/148* (2013.01); *B60L 9/00* (2013.01); *B64B 1/40* (2013.01); *B64C 39/022* (2013.01); *B64C 39/024* (2013.01); *B64C 2201/022* (2013.01)

(58) Field of Classification Search
USPC ...................................... 244/24, 25, 33, 30, 2
See application file for complete search history.

(56) References Cited

U.S. PATENT DOCUMENTS

| | | | | |
|---|---|---|---|---|
| 2,723,812 | A * | 11/1955 | Hohmann | 244/3 |
| 3,361,387 | A * | 1/1968 | Struble, Jr. | 244/33 |
| 3,658,278 | A * | 4/1972 | Batchelor | 244/33 |
| 3,841,510 | A * | 10/1974 | Walton et al. | 414/514 |
| 4,622,639 | A | 11/1986 | Adelson | |
| 4,787,575 | A * | 11/1988 | Stewart | 244/33 |
| 4,842,221 | A * | 6/1989 | Beach et al. | 244/115 |
| 6,325,330 | B1 * | 12/2001 | Lavan, Jr. | 244/33 |
| 6,648,273 | B2 | 11/2003 | Anast | |
| 7,317,261 | B2 * | 1/2008 | Rolt | 290/55 |
| 7,708,222 | B2 * | 5/2010 | Lee | 244/30 |
| 2005/0066871 | A1 * | 3/2005 | Shelton | 114/312 |
| 2006/0284004 | A1 * | 12/2006 | Jones | 244/33 |
| 2007/0007384 | A1 * | 1/2007 | Sliwa | 244/30 |
| 2012/0223181 | A1 * | 9/2012 | Ciampa | 244/30 |
| 2012/0234964 | A1 * | 9/2012 | Heppe | 244/2 |
| 2013/0233964 | A1 * | 9/2013 | Woodworth et al. | 244/2 |
| 2013/0264413 | A1 * | 10/2013 | Aoki et al. | 244/33 |

FOREIGN PATENT DOCUMENTS

WO    WO 2013013219 A1 *    1/2013

* cited by examiner

*Primary Examiner* — Joseph W Sanderson
(74) *Attorney, Agent, or Firm* — Toler Law Group, PC

(57) ABSTRACT

Systems and methods to launch an aircraft are disclosed. In one embodiment, a system comprises an electrically powered buoyant aircraft, a control system to maneuver the aircraft and a tether adapted to couple to the aircraft and to a ground-based power supply to provide power to the aircraft while the aircraft is coupled to the tether. The aircraft can disconnect autonomously from the tether in response to a command signal.

20 Claims, 8 Drawing Sheets

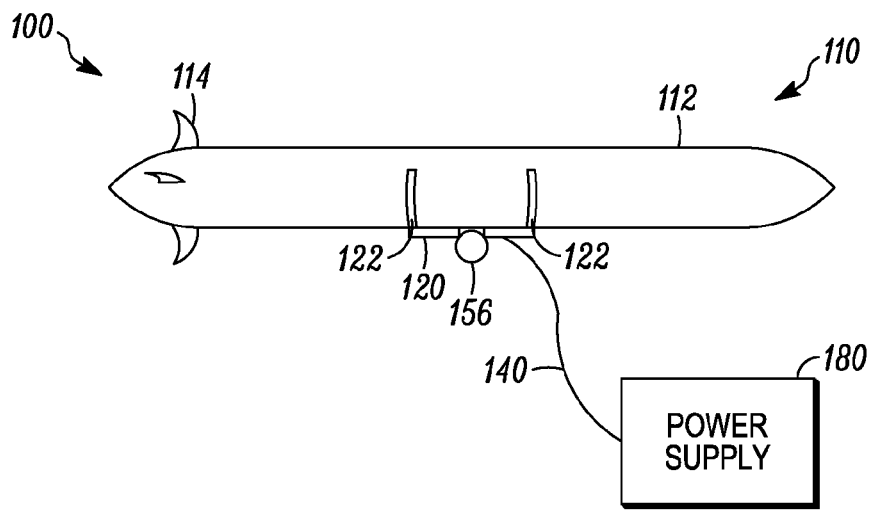
FIG. 1A
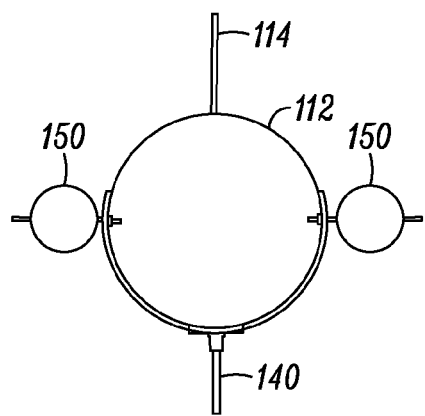
FIG. 1B
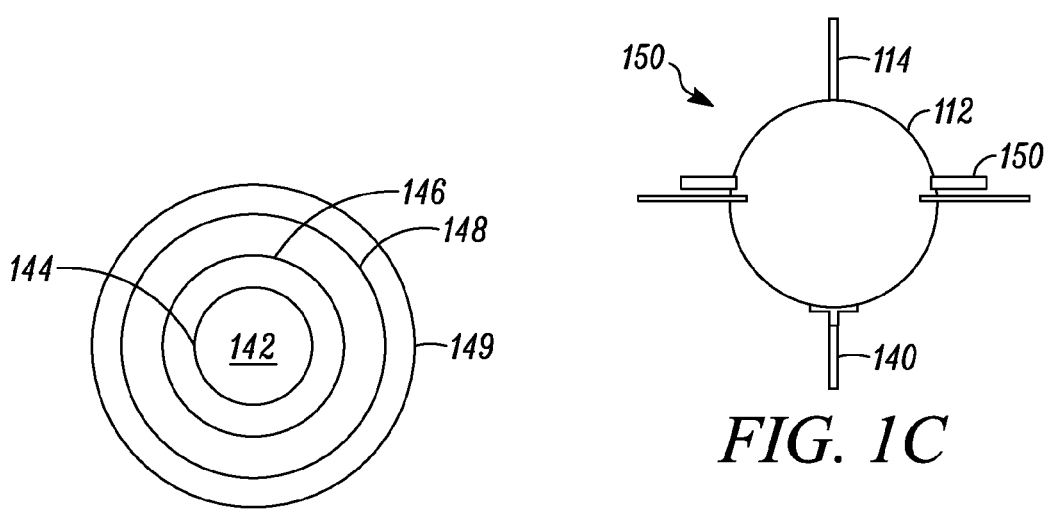
FIG. 1D
FIG. 1C

AUTONOMOUS AIRCRAFT WITH DISCONNECTABLE TETHER

BACKGROUND

The subject matter described herein relates to aerial surveillance and more particularly to an autonomous aircraft which may be used for aerial surveillance.

Aircraft, particularly smaller autonomous and semi-autonomous aircraft such as surveillance drones, blimps, and quad rotors, may be launched from ground-based launch platforms. There remains a need for autonomous aircraft which can operate autonomously over extended time periods.

SUMMARY

In one embodiment, a system comprises an electrically powered buoyant aircraft, a control system to maneuver the aircraft and a tether adapted to couple to the aircraft and to a ground-based power supply to provide power to the aircraft while the aircraft is coupled to the tether, wherein the aircraft can disconnect autonomously from the tether in response to a command signal.

In another embodiment, an electrically powered buoyant aircraft comprises an inflatable bladder filled with a gas that is less dense than air, a frame assembly to couple to the inflatable bladder, a control system to maneuver the aircraft, and an interface to couple the aircraft to a tether which provides a connection to a ground-based power supply to provide power to the aircraft while the aircraft is coupled to the tether, wherein the aircraft can disconnect autonomously from the tether in response to a command signal.

In another embodiment, a method to operate an aircraft comprises coupling an electrically powered buoyant aircraft to a tether which provides a connection to a ground-based power supply to provide power to the aircraft while the aircraft is coupled to the tether, and autonomously disconnecting the aircraft from the tether in response to a command signal.

Further areas of applicability will become apparent from the description provided herein. It should be understood that the description and specific examples are intended for purposes of illustration only and are not intended to limit the scope of the present disclosure

BRIEF DESCRIPTION OF THE DRAWINGS

Embodiments of methods and systems in accordance with the teachings of the present disclosure are described in detail below with reference to the following drawings.

FIGS. 1A-1C are schematic illustrations of a system comprising an autonomous aircraft, according to embodiments.

FIG. 1D is a schematic illustration of a tether which may be used in connection with an autonomous aircraft, according to embodiments.

DETAILED DESCRIPTION

Figure 2A:
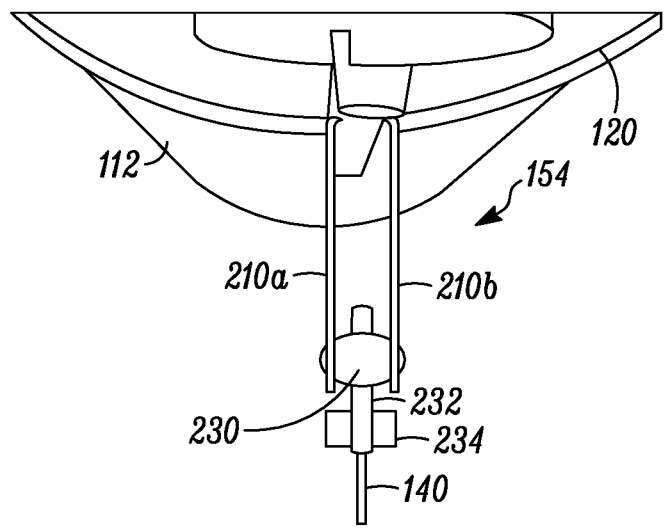
FIGS. 2A-2F are schematic illustrations of a release mechanism which may be used with an autonomous aircraft, according to embodiments.
Figure 2B:
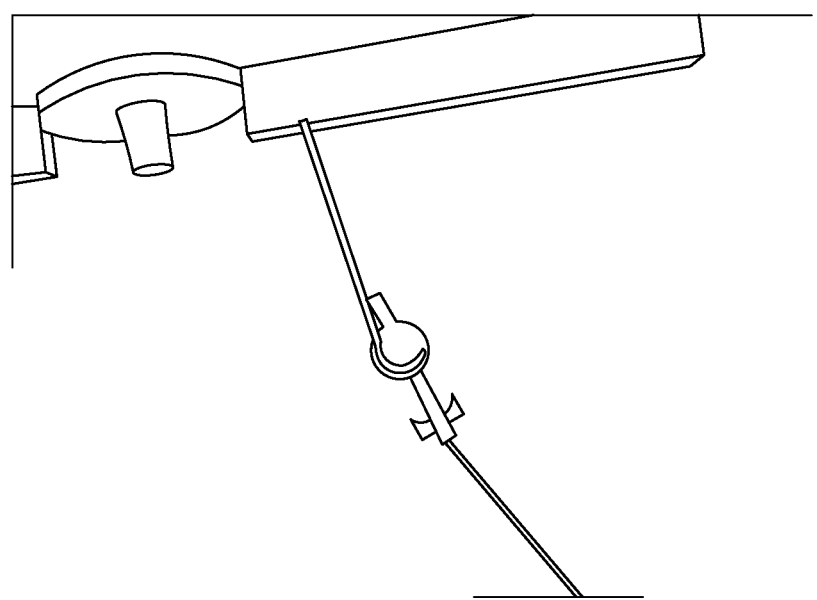
Figure 2C:
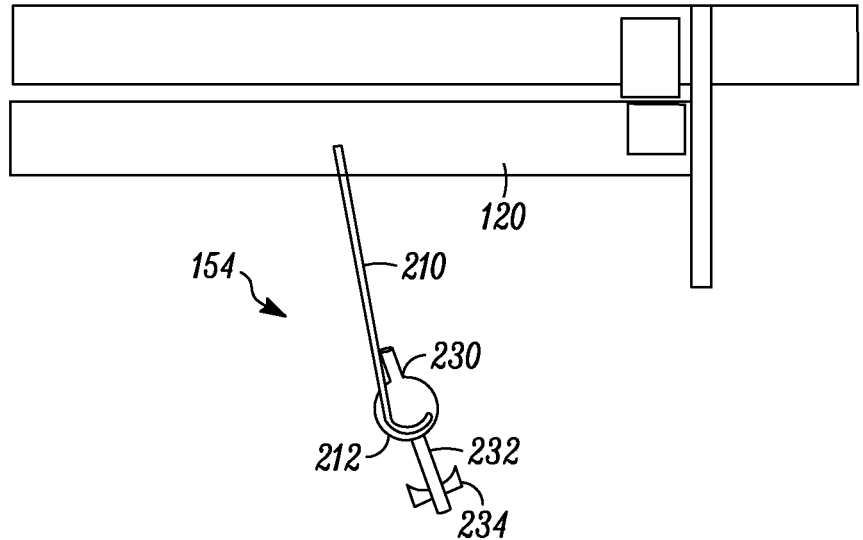
Figure 2D:
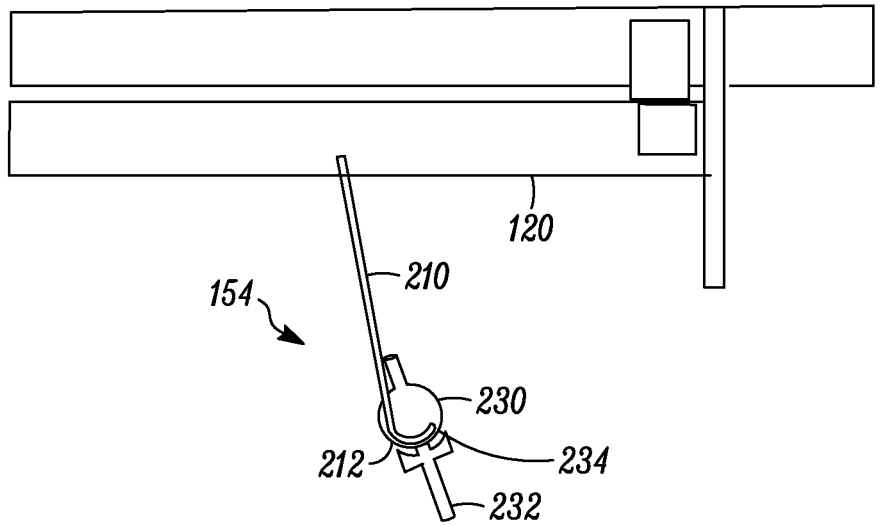

Various embodiments of systems, aircraft, and methods to operate an autonomous aircraft are described herein. Specific details of certain embodiments are set forth in the following description and the associated figures to provide a thorough understanding of such embodiments. One skilled in the art will understand, however, that alternate embodiments may be practiced without several of the details described in the following description.

Various aspects may be described herein in terms of functional and/or logical block components and various processing steps. For the sake of brevity, conventional techniques related to data transmission, signaling, network control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in a practical embodiment.

The following description may refer to components or features being "connected" or "coupled" or "bonded" together. As used herein, unless expressly stated otherwise, "connected" means that one component/feature is in direct physical contact with another component/feature. Likewise, unless expressly stated otherwise, "coupled" or "bonded" means that one component/feature is directly or indirectly joined to (or directly or indirectly communicates with) another component/feature, and not necessarily directly physically connected. Thus, although the figures may depict example arrangements of elements, additional intervening elements, devices, features, or components may be present in an actual embodiment.

FIGS. 1A-1C and FIG. 3 are a schematic illustrations of a system 100 comprising an autonomous aircraft, according to embodiments. Referring to FIGS. 1A-1C and FIG. 3, in some embodiments a system 100 comprises an electrically powered buoyant aircraft 110, a control system 130 to maneuver the aircraft 110, and a tether 140 adapted to couple to the aircraft 110 and to a remote power supply 180 to provide power to the aircraft 110 while the aircraft 110 is coupled to the tether 140.

Aircraft 110 may comprise an inflatable bladder 112 filled with a gas that is less dense than air and a frame assembly 120 to couple to the inflatable bladder 112. By way of example, in some embodiments inflatable bladder 112 may be formed from a durable, lightweight polymer material formed in the shape of a cylindrical body and having a diameter that measures between 12 inches and 36 inches and a length that measures between 5 feet and 35 feet. By way of example, in some embodiments the inflatable bladder 112 may be filled with a gas such as helium or hydrogen. Other suitable gasses may include, but are not limited to, neon, ammonia, and/or methane.

The aircraft 110 may further comprise a frame assembly 120 to couple to the inflatable bladder 112. The frame assembly 120 may be formed from a suitable lightweight material, e.g., a lightweight polymer, graphite, carbon composite material or the like. The frame assembly 120 may comprise one or more arms 122 configured to wrap around an exterior portion of the inflatable bladder 112 when the bladder is inflated with a gas to help retain the inflatable bladder 112 with the frame 120.

One or more thrust generators 150 may be coupled to the frame assembly 120. By way of example, a thrust generator 150, may include a propeller or other engine to generate thrust for the aircraft 110. In some embodiments, the thrust generators 150 may be rotatable between a first position (FIG. 1B) in which the thrust generators 150 provide thrust in a forward or reverse direction and a second position (FIG. 1C) in which the thrust generators 150 provide thrust in a upwardly or downwardly direction. In such embodiments, the thrust generators 150 may be adjusted at angles between the first position and the second position to provide directional control to the aircraft 110. Further, in some embodiments, the thrust generators 150 may be controlled independently such that differences in thrust generated by the respective thrust generators 150 may facilitate providing directional control to aircraft 110.

In some embodiments, aircraft 110 may comprise one or more control surfaces, such as fins 114, which facilitate directional control of aircraft 110. The fins 114 depicted in FIGS. 1A-1C are passive control surfaces. In alternate embodiments, the aircraft 110 may comprise active control surfaces.

At least one image capture device 156 may be coupled to the frame assembly 120. By way of example, the image capture device 156 may comprise one or more cameras or video monitors which may have a fixed or variable focal length. Examples of suitable image capture devices include closed circuit digital cameras, digital video devices, single lens reflex cameras, or the like.

FIG. 1D is a schematic illustration of a tether 140 which may be used in connection with an autonomous aircraft, according to embodiments. Referring to FIG. 1D, in some embodiments, a tether 140 may optionally comprise a fluid passage tube 142 which, in the embodiment depicted in FIG. 1D extends axially in the center of the tether 140 to allow a fluid, e.g., a lighter than air gas, to be provided to the inflatable bladder 112 when the aircraft 110 is coupled to the tether 140. Tether 140 may further comprise an electrical bus which comprises a first conductor 144 and a second conductor 146 to conduct alternating current (AC) power. In the embodiment depicted in FIG. 1D, the first conductor 144 and the second conductor 146 are arranged coaxially. Tether 140 may further comprise an optional communication bus 148 which is also arranged coaxially. A protective sheath 149 may surround the communication bus 148.

Remote power supply 180 may be a ground-based power supply that generates alternating current (AC) power at a voltage range between 270 volts and 1200 volts. The AC power may be conducted by conductors 144, 146 through the tether 140 to aircraft 110. Aircraft 110 may comprise a power converter 158 to convert the AC power supplied by remote power supply 180 from AC power to a direct current (DC) power at a voltage range between 12 volts and 48 volts and a battery 159 to store power.

As best illustrated in FIGS. 1B and 1C, in some embodiments, the tether 140 may be removably coupled to the aircraft 110 by a suitable interface that provides a fluid connection between the fluid passage tube 142 and the inflatable bladder 112, an electrical connection between the electrical conductors 144, 146 and the power converter 158.

In some embodiments, the aircraft 110 may comprise a release mechanism 154 to release the aircraft 110 from the tether 140. FIGS. 2A-2E are schematic illustrations of a release mechanism which may be used with an autonomous aircraft, according to embodiments. Referring to FIGS. 2A-2E, in some embodiments the release mechanism 154 may comprise two opposing tether hooks 210a, 210b, which may be referred to collectively here by reference numeral 210. Tether hooks 210 may be pivotably mounted to frame 120 at a first end such that they can rotate between a first position in which the tether hooks 210 are retracted and a second position in which the tether hooks 210 are extended, as illustrated in FIGS. 2A-2F.

Tether hooks 210 may comprise a curved section 212 at a second end, opposite the first end. Curved section 212 may be configured to receive a tether ball 230 which may be coupled to the tether 140. Tether ball 230 may be coupled to a shaft 232. A locking nut 234 may be mounted on the shaft 232 and moveable between a first position (FIG. 2C) in which the locking nut 234 is displaced from the curved section 212 of the tether hooks 210 and a second position (FIG. 2D) in which the locking nut 234 is adjacent the curved section 212 of the tether hooks 210 in order to lock the tether hooks 210 in place to retain the tether ball 230.

Figure 2E:
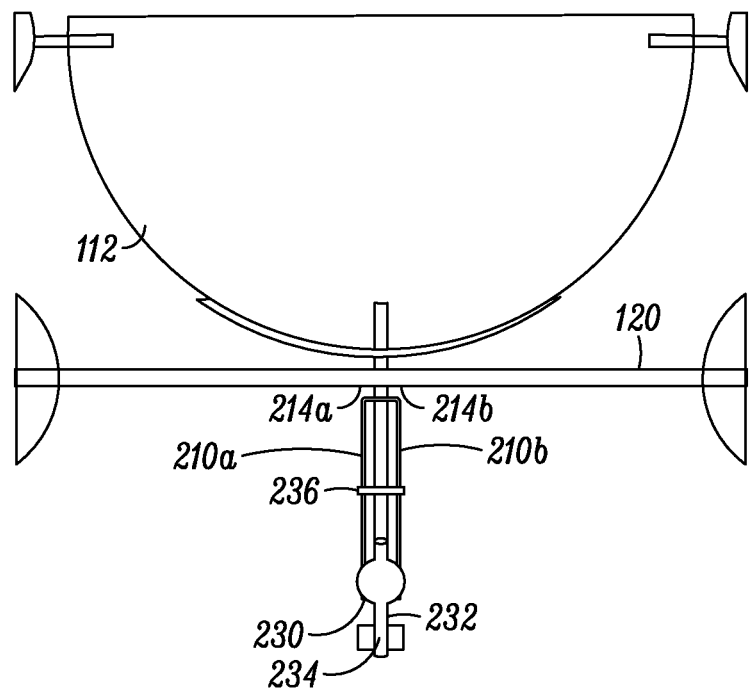
Figure 2F:
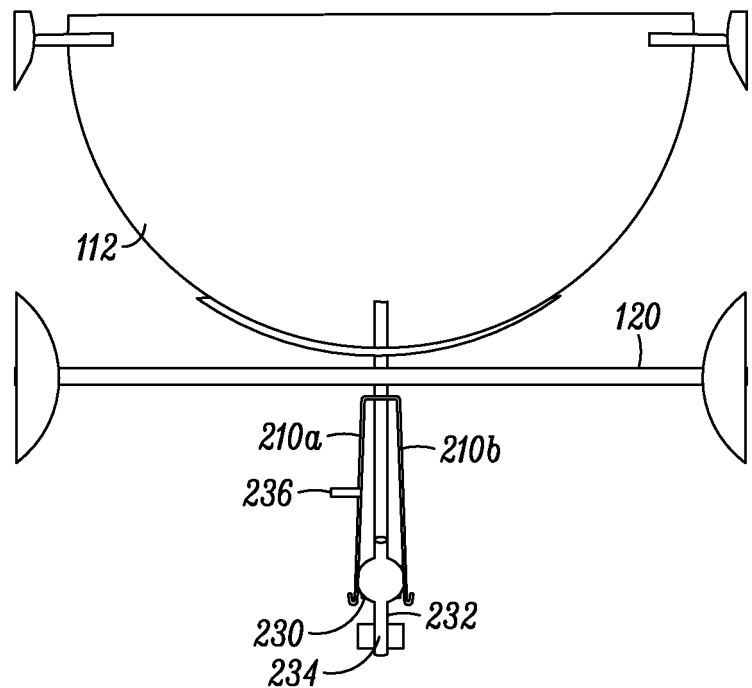

In some embodiments tether, hooks 210 may comprise an actuator 236 to actuate release of the tether ball 230, and thereby the tether 140, from the tether hooks 210. In some embodiments, the tether hooks 210 may be biased in an outwardly direction such that in a resting state the tether hooks 210 are displaced from the tether ball 230 (FIG. 2F). In such embodiments, the actuator 236 may comprise a latch to retain the tether hooks 210 in a closed position (FIG. 2E). The latch may be released by a solenoid or other actuator 236 to allow the tether hooks 210 to return to a resting position (FIG. 2F) to release the tether ball 230.

In some embodiments, the tether ball 230 may comprise electrical contacts which couple with the electrical bus conductors 144, 146 in the tether 140, and the tether hooks 210 may comprise corresponding electrical contacts to allow for transfer of electrical power from the tether 140 to the tether hooks 210. Electrical conduits 214a, 214b may extend from the respective tether hooks 210a, 210b to provide an electrical connection with the power converter 158.

Figure 3:
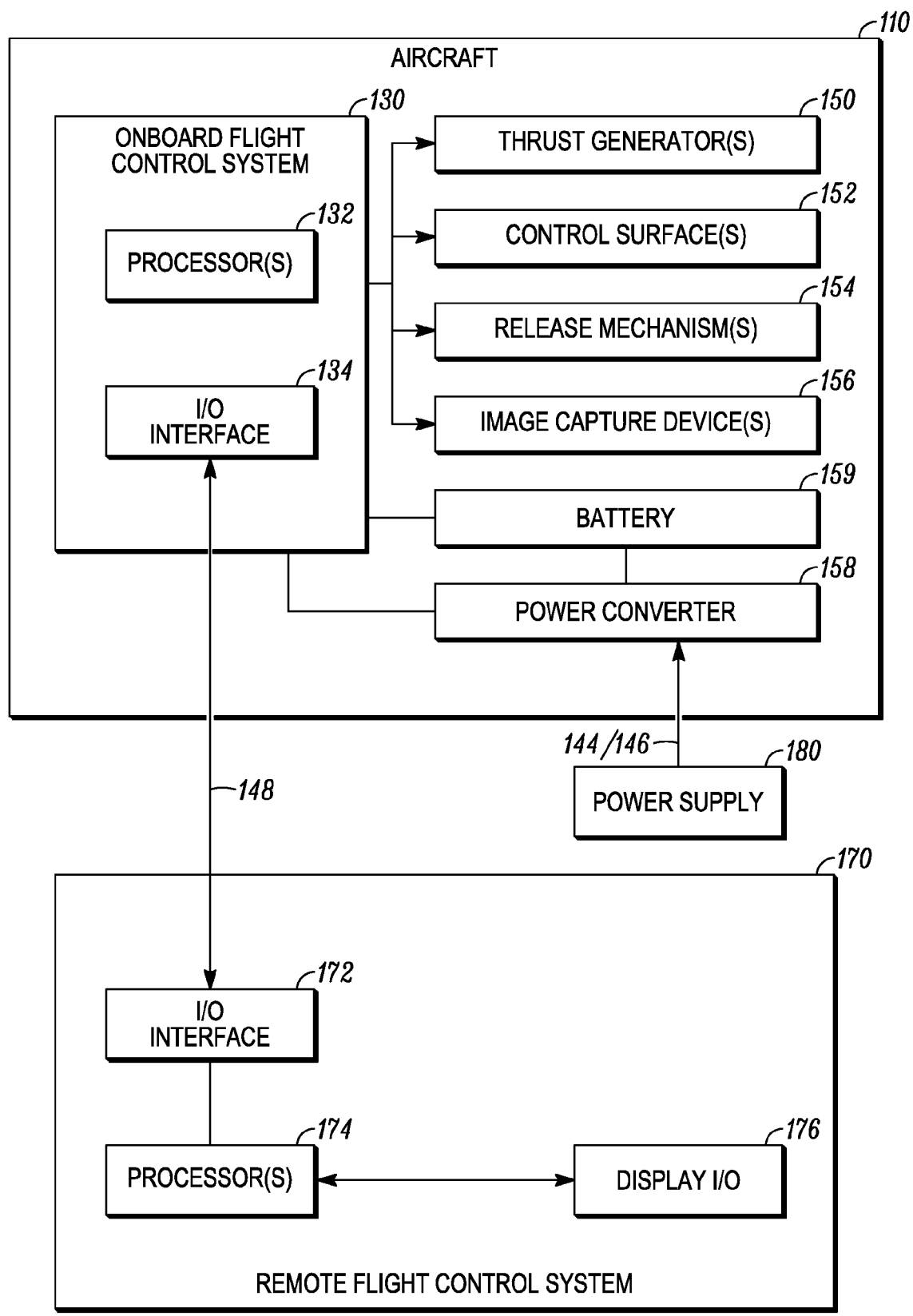
FIG. 3 is a schematic illustrations of a system comprising an autonomous aircraft, according to embodiments.

Referring to FIG. 3, in some embodiments, aircraft 110 comprises an onboard flight control system 130, which in turn may comprise one or more processor(s) 132, and an input/output interface 134. The onboard flight control system 130 may be communicatively coupled to a remote flight control system 170 via a suitable communication link. By way of example, in some embodiments, the tether 140 may comprise a communication bus to provide a communication link between the onboard flight control system 130 and the remote flight control system 170. In alternate embodiments, a wireless communication link may be provided between onboard flight control system 130 and remote flight control system 170. Remote flight control system 170 may comprise an I/O interface 172, one or more processors 174 and a display or other input/output mechanism 176.

Onboard flight control system 130 may be coupled to the thrust generator(s) 150 and control surfaces 152 to control flight operations of aircraft 110. Further, onboard flight control system 130 may be coupled to the release mechanism 154 and to the image capture device 156.

In some embodiments aircraft 110 may be controlled via the remote flight control system 170, which may be operated automatically or by an operator interfacing with the display or other input/output mechanism 176. The remote flight control system 170 may generate command signals, which are transmitted to the onboard flight control system 130. The onboard flight control system 130 in turn, controls the thrust generator(s) 150 and/or control surface(s) 152 to control flight operations of aircraft 110. Further the remote flight control system 170 may generate control signals to manage the operations of the release mechanism 154 and image capture device(s) 156.

Figure 4:
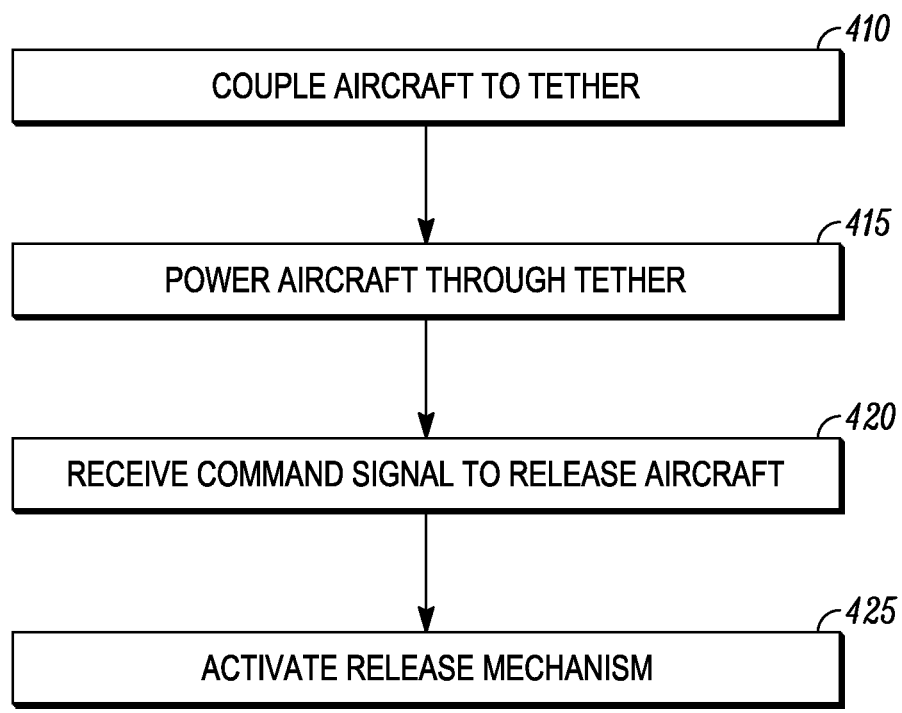
FIG. 4 is a flowchart illustrating operations in a method to operate an autonomous aircraft, according to embodiments

FIG. 4 is a flowchart illustrating operations in a method to operate an autonomous aircraft 110, according to embodiments. Referring to FIG. 4, at operation 410 the aircraft 110 is coupled to a tether 140. As described above, when the aircraft 110 is coupled to the tether 140 the aircraft 110 is powered (operation 415) through the tether 140. In this configuration the aircraft 110 draws its power from the remote power source 180.

At operation 420 the onboard flight control system 130 receives a control signal, e.g., from the remote flight control system 170 to release the aircraft from the tether 140. At operation 425 the onboard flight control system 130 activates the release mechanism 154 to release the tether ball 230, and thereby the tether 140, from the tether hooks 210, thereby allowing the aircraft 110 to operate autonomously off tether. In this configuration, the aircraft 110 draws its power from the battery 159.

Thus, in accordance with the description herein, there is provided an electric-powered aircraft 110 capable of being deployed in two modes of operation: a tethered mode and an untethered, or free-flight, mode. In some embodiments, the aircraft 110 and its components may weigh between about 5 and 10 pounds, and the inflatable bladder may be filled with a gas that is less dense than air such that the aircraft 110 is approximately neutrally buoyant and can hover for extended durations of time.

In the tethered mode, the aircraft 110 draws power from a remote e.g., ground-based) power supply via the electrical bus conductors 144, 146 in the tether 140. In this mode, the thrust generators 150 may be activated to provide any additional lift required to support the weight of the tether 140 coupled to the aircraft 110. In some embodiments, the tether 140 may extend 500 feet or more, providing a wide operational range for the aircraft 110.

In the untethered, or free-flight, mode the aircraft 110 draws power from the battery 159. Because the aircraft 110 is approximately neutrally buoyant the thrust generator(s) 150 are required only for forward/reverse motion; thrust is not required to maintain altitude. This reduces the power drawn from the battery 159.

Figure 5A:
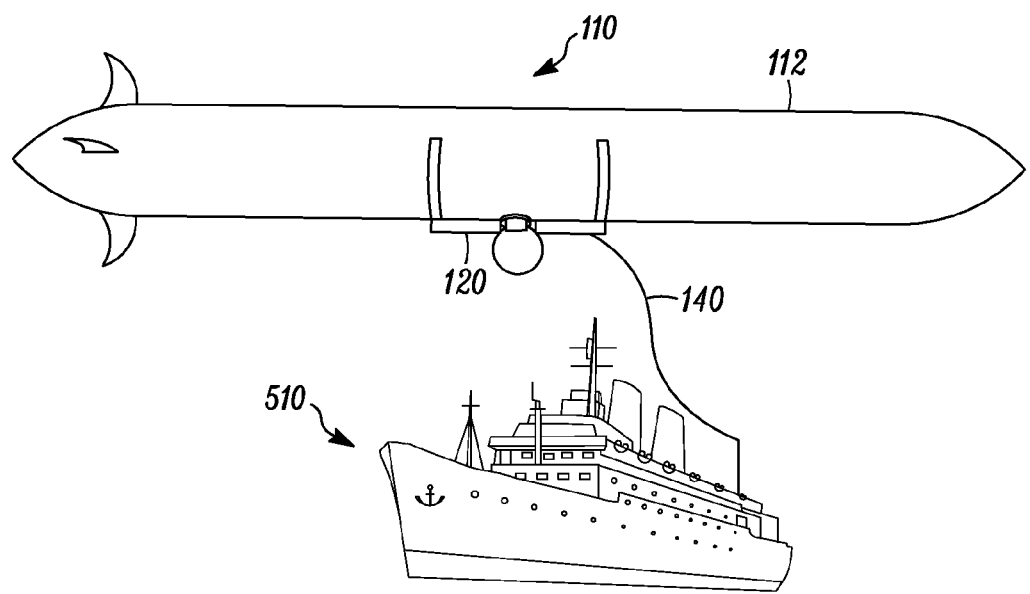
FIGS. 5A-5D are schematic illustrations of various deployment scenarios of a system comprising an autonomous aircraft, according to embodiments.
Figure 5B:
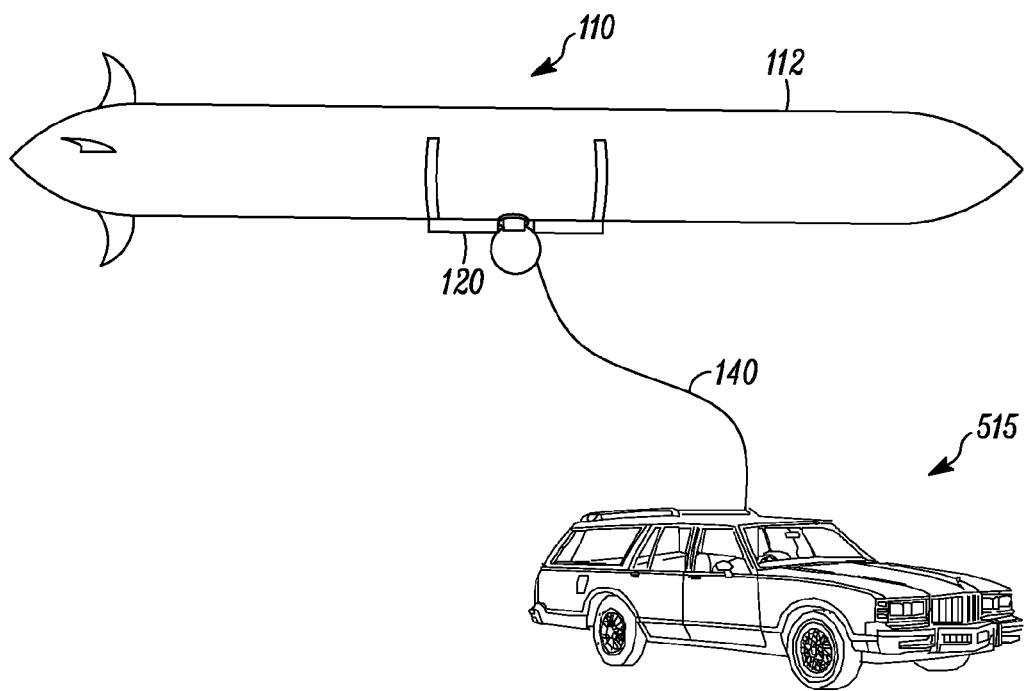
Figure 5C:
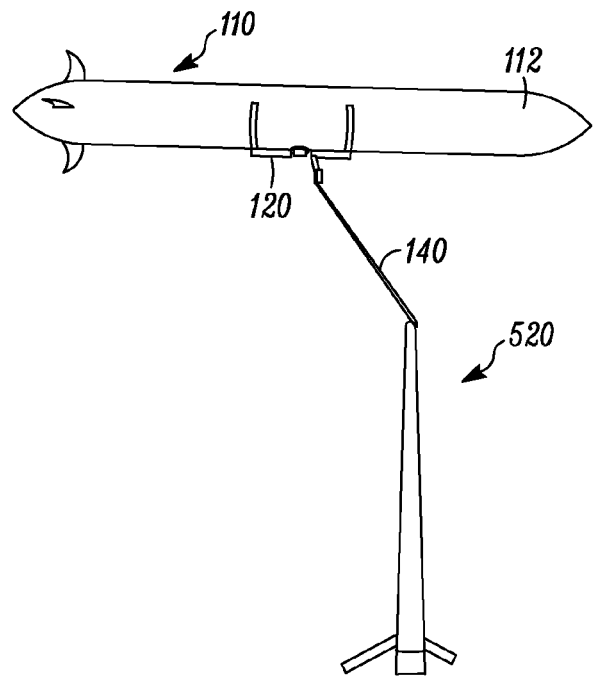
Figure 5D:
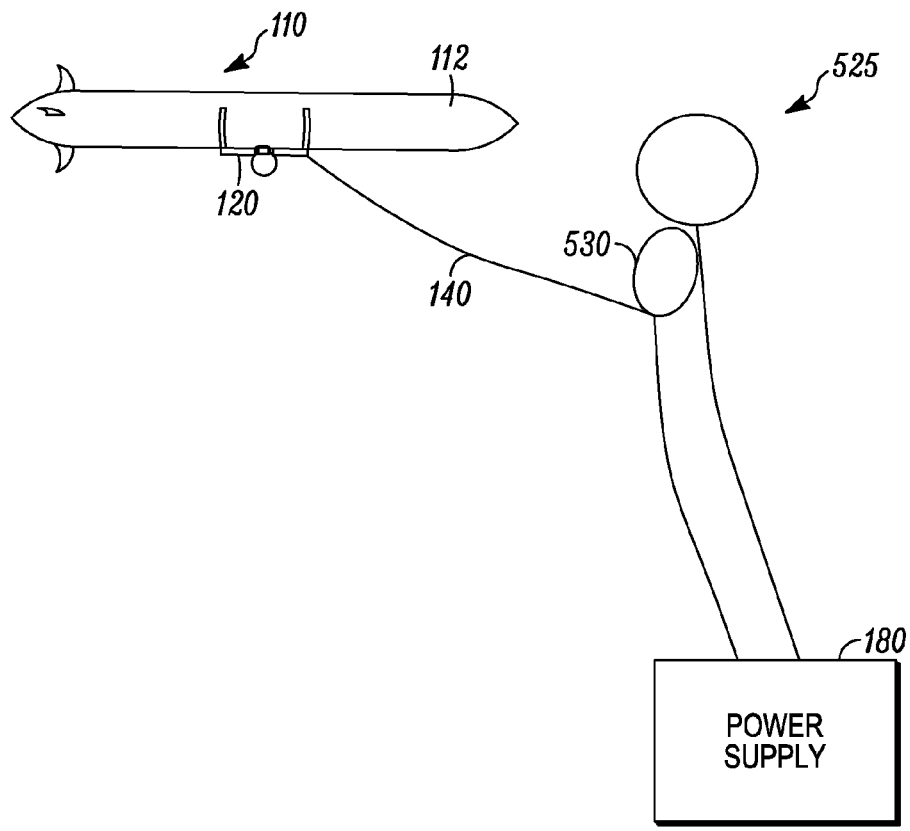

FIGS. 5A-5D are schematic illustrations of various deployment scenarios of a system comprising an autonomous aircraft, according to embodiments. In some embodiments, the aircraft 110 may be deployed from a water-based vehicle, such as a ship 510 (FIG. 5A); a ground-based vehicle, such as an automobile 515 (FIG. 5B); or a ground-based structure, such as a tower 520 (FIG. 5C). In further embodiments, the aircraft 110 may be coupled to an airborne structure, such as a buoyant balloon 525 (FIG. 5D) via a ring 530. The balloon 525 and ring 530, in some embodiments, help to support the weight of the tether 140, which allows the aircraft 110 to use a longer tether 140, thereby extending the tethered range of the aircraft 110. One skilled in the art will recognize that other deployment scenarios are possible.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A system, comprising:
    an aircraft including a control system configured to control movement of the aircraft;
    a tether configured to couple the aircraft to a remote power supply, wherein the remote power supply provides power to the aircraft via the tether, and wherein the aircraft is configured to disconnect from the tether in response to a command signal from the control system; and
    a release mechanism coupled to the aircraft, the release mechanism configured to release the tether in response to the command signal, wherein the release mechanism includes tether hooks configured to receive a tether ball coupled to the tether, wherein the tether hooks are configured to hold the tether ball when in a first configuration, and wherein the tether hooks are configured to release the tether ball when in a second configuration.

2. The system of claim 1, wherein the control system is configured to send the command signal while in flight.

3. The system of claim 1, wherein the aircraft comprises:
    an inflatable bladder filled with a gas that is less dense than air; and
    a frame assembly coupled to the inflatable bladder.

4. The system of claim 3, further comprising at least one thrust generator coupled to the frame assembly, wherein the at least one thrust generator is controlled by the control system to move the aircraft.

5. The system of claim 4, wherein the aircraft is neutrally buoyant, and wherein the at least one thrust generator provides lift to support a weight of the tether when the aircraft is coupled to the tether.

6. The system of claim 1, wherein the release mechanism further includes an actuator configured to arrange the tether hooks in the first configuration, and wherein the actuator is configured to arrange the tether hooks in the second configuration in response to the command signal.

7. The system of claim 1, wherein the tether further comprises a latch, wherein the latch is configured to move between a first position on the tether and a second position on the tether, wherein the latch prevents the tether hooks from being arranged in the second configuration when the latch is in the first position, and wherein the latch does not prevent the tether hooks from being arranged in the second configuration when the latch is in the second position.

8. The system of claim 1, wherein the tether comprises:
    an electrical bus;
    a communication bus; and
    a fluid passage tube.

9. An aircraft, comprising:
    an inflatable bladder to retain a gas that is less dense than air;
    a frame assembly coupled to the inflatable bladder;
    a control system configured to control movement of the aircraft;
    an interface configured to couple the aircraft to a tether that provides a connection to a ground-based power supply, wherein the ground-based power supply provides power to the aircraft via the connection, and wherein the aircraft is configured to disconnect from the tether in response to a command signal from the control system; and
    a release mechanism coupled to the aircraft, the release mechanism configured to release the tether in response to the command signal, wherein the release mechanism includes tether hooks configured to receive a tether ball coupled to the tether, wherein the tether hooks are configured to hold the tether ball when in a first configuration, and wherein the tether hooks are configured to release the tether ball when in a second configuration.

10. The aircraft of claim 9, wherein the ground-based power supply provides alternating current (AC) power to the tether, and wherein the aircraft comprises a power converter to convert the AC power to direct current (DC) power.

11. The aircraft of claim 9, further comprising at least one thrust generator coupled to the frame assembly, wherein the at least one thrust generator is controlled by the control system to move the aircraft.

12. The aircraft of claim 11, wherein the aircraft is neutrally buoyant when the inflatable bladder contains the gas, and wherein the at least one thrust generator provides lift to support a weight of the tether when the aircraft is coupled to the tether.

13. The aircraft of claim 11, further comprising at least one image capture device coupled to the frame assembly.

14. The aircraft of claim 9, wherein the tether comprises:
an electrical bus;
a communication bus; and
a fluid passage tube.

15. The aircraft of claim 9, wherein the control system generates the command signal in response to a flight control signal received by the control system from a remote flight control system.

16. A method, comprising:
coupling an aircraft to a tether which provides a connection to a ground-based power supply, wherein the ground-based power supply provides power to the aircraft via the connection, and wherein the aircraft is an electrically powered buoyant aircraft; and
disconnecting the aircraft from the tether in response to a command signal from the aircraft, wherein the aircraft is disconnected from the tether via a release mechanism coupled to the aircraft, wherein the release mechanism includes tether hooks configured to receive a tether ball coupled to the tether wherein the tether hooks are configured to hold the tether ball when in a first configuration, and wherein the tether hooks are configured to release the tether ball when in a second configuration.

17. The method of claim 16, wherein the ground-based power supply provides alternating current (AC) power to the tether, and wherein the aircraft comprises a power converter to convert the AC power to direct current (DC) power.

18. The method of claim 16, further comprising operating the aircraft after the aircraft is released from the tether.

19. The method of claim 16, further comprising sending the command signal while the aircraft is in flight.

20. The method of claim 16, wherein the tether further comprises a latch, wherein the latch is configured to move between a first position on the tether and a second position on the tether, wherein the latch prevents the tether hooks from being arranged in the second configuration when the latch is in the first position, and wherein the latch does not prevent the tether hooks from being arranged in the second configuration when the latch is in the second position.

* * * * *